United States Patent
Lee

(10) Patent No.: US 6,873,334 B2
(45) Date of Patent: Mar. 29, 2005

(54) METHOD OF BUFFER MANAGEMENT AND TASK SCHEDULING FOR TWO-DIMENSIONAL DATA TRANSFORMING

(75) Inventor: Tsung-en Andy Lee, Palo Alto, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 623 days.

(21) Appl. No.: 09/802,458

(22) Filed: Mar. 9, 2001

(65) Prior Publication Data

US 2002/0126123 A1 Sep. 12, 2002

Related U.S. Application Data

(60) Provisional application No. 60/217,825, filed on Jul. 12, 2000.

(51) Int. Cl.[7] .............................................. G06F 12/10
(52) U.S. Cl. ........................ 345/568; 345/560; 711/202; 718/100
(58) Field of Search ................................ 345/568, 564, 345/566, 569, 501, 530, 471, 572–574, 560, 558; 711/202–208; 348/714–718, 222.1, 441; 382/233; 718/100, 102

(56) References Cited

U.S. PATENT DOCUMENTS

| | | | | |
|---|---|---|---|---|
| 5,572,695 A | * | 11/1996 | Andrews et al. | 711/202 |
| 5,771,048 A | * | 6/1998 | Nankou et al. | 345/471 |
| 5,781,242 A | * | 7/1998 | Kondo et al. | 348/441 |
| 5,920,343 A | * | 7/1999 | Watanabe et al. | 348/222.1 |
| 5,982,936 A | * | 11/1999 | Tucker et al. | 382/223 |

* cited by examiner

Primary Examiner—Kee M. Tung
(74) Attorney, Agent, or Firm—J.C. Patents

(57) ABSTRACT

A method of buffer management and task scheduling for two-dimensional data transforming is described. The method includes the steps of reading out old data in a block-by-block pattern and immediately writing in new data in a line-by-line pattern in a buffer using a first mapping scheme. And reading out a following old data in a block-by-block pattern and immediately writing in a following new data in a line-by-line pattern in the buffer using a second mapping scheme. The first and second mapping schemes are interleaved to guarantee output sequences while the buffer is kept full all the time. The buffer thus is maximized, the output flow is continuous and the process loading is smoothed out without loading bursts.

24 Claims, 2 Drawing Sheets

METHOD OF BUFFER MANAGEMENT AND TASK SCHEDULING FOR TWO-DIMENSIONAL DATA TRANSFORMING

CROSS-REFERENCE TO RELATED APPLICATION

This application claims the priority benefit of provisional application Ser. No. 60/217,825, filed Jul. 12, 2000, the full disclosure of which is incorporated herein by reference.

BACKGROUND OF THE INVENTION

1. Field of Invention

The present invention relates to a method of buffer management and task scheduling. More particularly, the present invention relates to a method of buffer management and task scheduling for two-dimensional data transforming.

2. Description of Related Art

Two-dimensional Discrete Fourier Transforms, such as Discrete Cosine Transform (DCT), are widely used in image processing, digital signal processing, digital communications, etc. Due to its intrinsic properties, two-dimensional transform operation requires significant amount of memory to store data. One good example is a two-dimensional DCT (2D-DCT) operated on a two-dimensional image. As illustrated in FIG. 1, an image 10 is scanned line-by-line from the left-top corner to the right-bottom corner. In order to perform 2D-DCT with 6×6 block size 12, at least five lines of data 16 have to be stored. Furthermore, new input data (not shown) keeps coming in while old data 14 are being processed. Since the input data follow a line-by-line pattern and the old data 14 are processed in a block-by-block pattern, there is a conflict in memory space.

Traditionally, there are two solutions to solve this problem. The first solution is to use two six-line buffers, one for reading out data and the other for writing data in, and then swapping the buffers every six lines. However, this requires double the memory space than required in theory. The second solution is to process the 2D-DCT very quickly and to clean out the memory space before the read-write conflict occurs. Though, this causes significant processing bursts while receiving the "last line" 18 of the 6×6 blocks 12. It does not only require very extensive computations for such processing bursts, but also waste the computing resources while staying idle and waiting for all necessary data to be processed.

The invention provides a new solution to the problem stated above. The invention uses the minimum space required in theory and distributes the process loading evenly in time domain. It eliminates the trade-off between memory size and computing power, which has been recognized as a serious dilemma in 2D Discrete Fourier Transforms. The invention also presents a practical implementation of these presented ideas which is very simple and, therefore, consumes much less power than traditional designs do.

SUMMARY OF THE INVENTION

The invention provides a method of buffer management and task scheduling for two-dimensional data transforming, which transforms data in a buffer sequentially by blocks, wherein a block comprises a specific size having plurality of row portions and a plurality of column portions. The method comprises the steps of initializing a write logic address and a read logic address to zero. Then, old data is read out in a block-by-block pattern. While reading out data, new data is written in immediately in a line-by-line pattern in the block using a first mapping scheme. After the whole block is read out, the block is moved to process another column portion. Then old data in the block is again read out in a block-by-block pattern while new data is again written in immediately in a line-by-line pattern in the block using a second mapping scheme. After the whole block is read out again, the block is moved to process another column portion. These read and write steps with the interleaving of the first and second mapping schemes are repeated until the whole data in the buffer is processed.

Prior to the read and write steps, the block is completely filled with data using a second mapping scheme. After the block is filled, the write logic address is incremented by 1. Accordingly, the write logic address is incremented by 1 per buffer write, and the read logic address is incremented by 1 per buffer read as well.

According to the invention, the first and second mapping scheme translates logical addresses to physical addresses, which are really used to access the buffer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
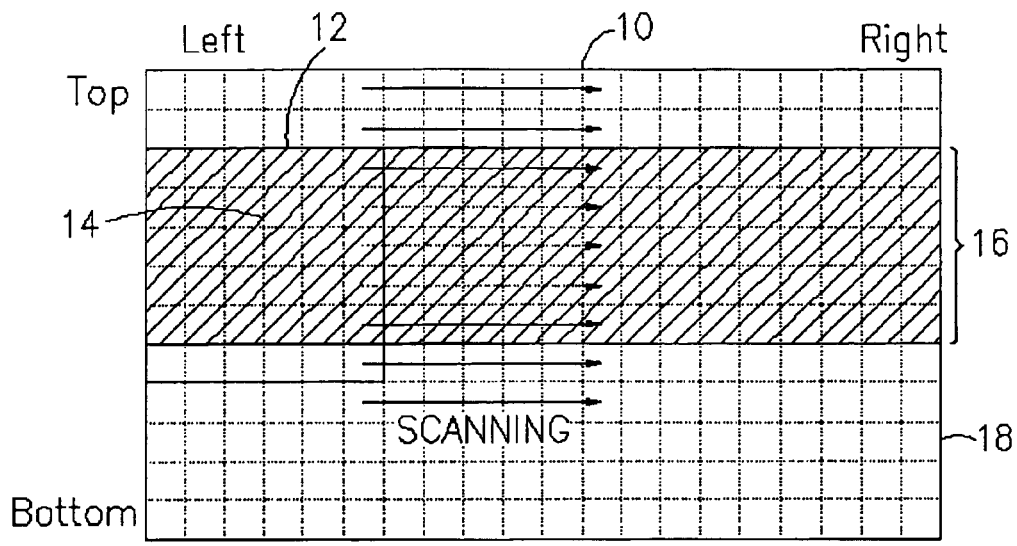
FIG. 1 is a conventional method of buffer management and task scheduling for two-dimensional data transforming.

Reference will now be made in detail to the present preferred embodiments of the invention, examples of which are illustrated in the accompanying drawings. Wherever possible, the same reference numbers are used in the drawings and the description to refer to the same or like parts.

Before discussing the embodiments of the invention, a general and qualitative description of the invention should prove useful. The basic idea behind the invention is to keep the data input and output rates the same. In other words, in average, one datum from processing is taken out from the memory while writing one new datum into the same memory. By doing so, the memory space can be fully utilized and the process loading can be evenly distributed. This may sound straightforward, however in reality, what just have been described is very hard to implement, since the input and output data follow different patterns. The 2D data is scanned in a line-by-line pattern, but they are processed in a block-by-block pattern. If new data is simply filled in the memory locations that are just emptied, the memory read-out pattern needs to be changed to fulfill the original block-by-block output requirement. This means that the memory is being emptied in a different manner. Therefore, the pattern for writing the following data in the memory changes. In consequence, the memory read-out pattern for the next data changes again. The situation repeats itself. After a few iterations, the patterns for writing and reading the memory look almost random. Unless a huge record to track all the previous input and output data is available, it is very hard, if not impossible, to know where to write the new data and read out the necessary data for processing. Keeping such a record is not practical because it will require much more memory space than needed in storing the original data. In this invention, by re-arranging the order of output blocks, robust addressing schemes are created for input and output sequences to resolve the problem discussed above.

Figure 2:
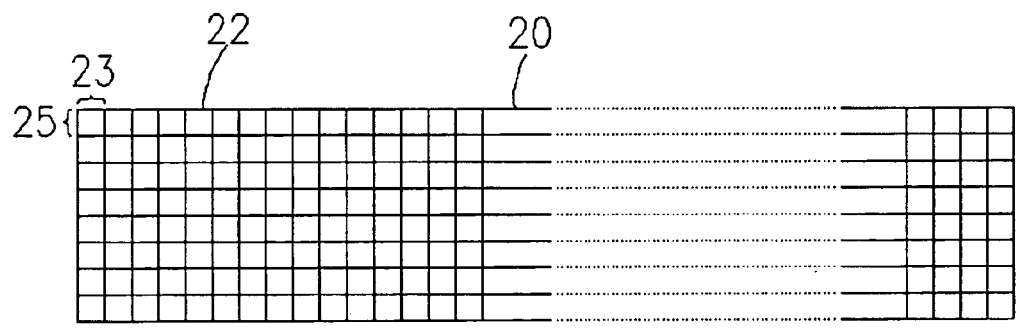
FIG. 2 is a logical addressing method of buffer management and task scheduling for two-dimensional data transforming in a preferred embodiment according to the invention.

The operations of the novel buffer management and task scheduling for 2D-DCT is best described by an example. FIG. 2 is a logical addressing scheme of a buffer management and task scheduling for two-dimensional data transforming in a preferred embodiment according to the invention.

In FIG. 2, assuming a 2D-DCT with 8×8 block size 22 is performed on an image 20 of 512 pixels per line. A 9-bit binary word 23 is used to address the pixels on each line, and a 3-bit binary word 25 is used to address the minimal 8 lines required for the 8×8 block size.

The 9-bit pixel address 23 is separated into 3-bit "dot", 3-bit "block", and 3-bit "sector" addresses. Associating this with the 3-bit line address 25, {3-bit line address, 9-bit pixel address} is equal to {3-bit line address, 3-bit sector address, 3-bit block address, 3-bit dot address}. Two logical addresses of this kind is obtained for buffer write and buffer read respectively. These two logical addresses are increased by one from zero per access. In addition, two types of address mappings are defined for buffer write and buffer read. These two mappings translate logical addresses to physical addresses, which are really used to access the memory of the buffer. So, a write logical address, a write physical address, a read logical address, a read physical address, and two address mapping schemes is obtained. The two address mapping schemes are listed as follows:

Mapping Scheme A: Physical Address={Sector Address, Line Address, Block Address, Dot Address}

Mapping Scheme B: Physical Address={Sector Address, Block Address, Line Address, Dot Address}

Figure 3:
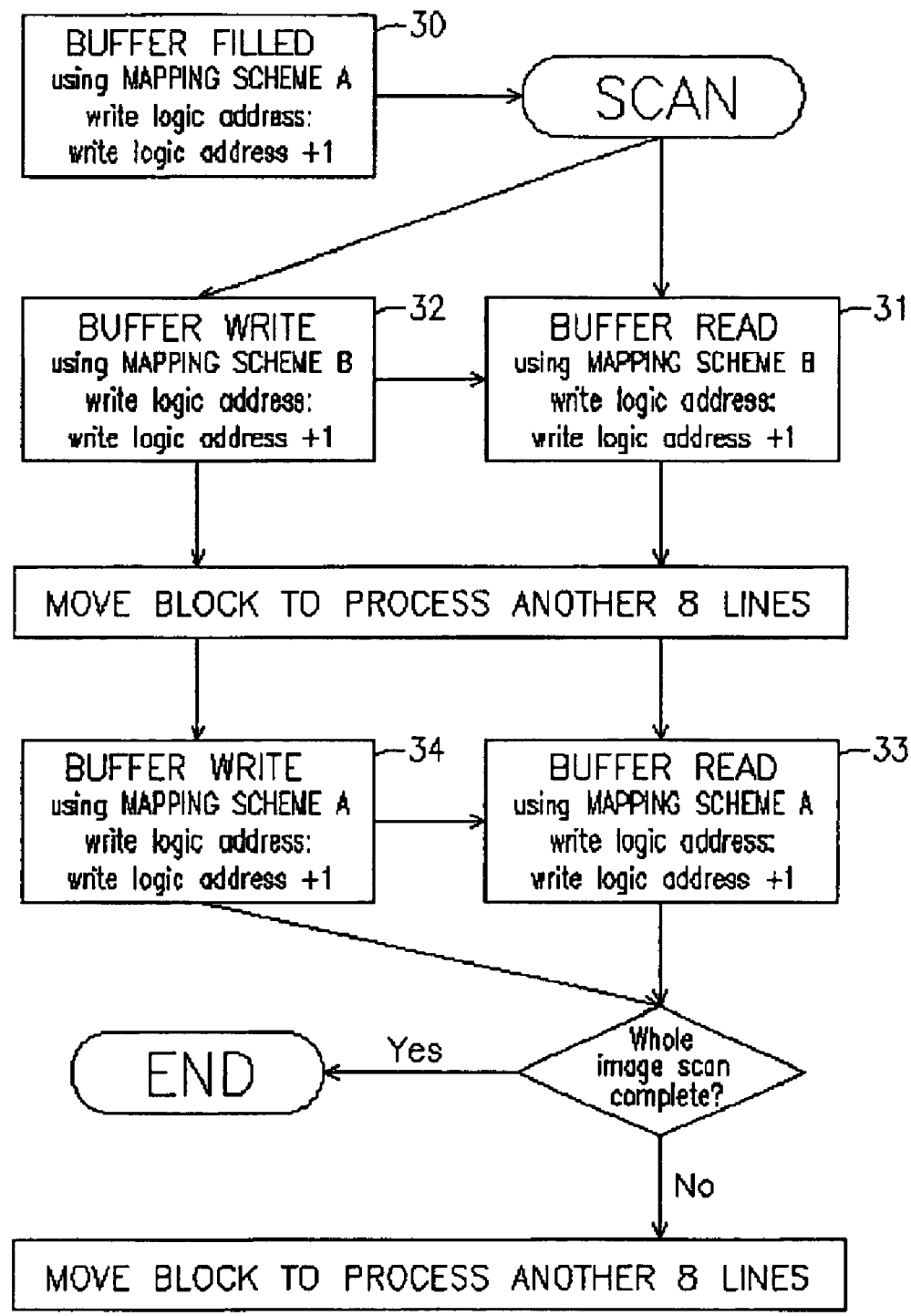
FIG. 3 is a flow chart overview of the operational procedure of buffer management and task scheduling for two-dimensional data transforming in a preferred embodiment according to the invention.

FIG. 3 is a flow chart overview of the operational procedure of buffer management and task scheduling for two-dimensional data transforming in a preferred embodiment according to the invention. In step 30, for the first time usage, the memory buffer is filled up using Mapping Scheme A for buffer writes. The write logic address is increased by one from zero per buffer write.

Next, at step 31, when the buffer is fill, it is ready to perform an 8×8-block size 2D-DCT operation. The read logic address is increased by one from zero per read write. Data of 8×8 block are read out by using Mapping Scheme B for buffer read. This mapping automatically guarantees the output sequence required by 2D-DCT operations.

Then, at step 32, while reading out data for 2D-DCT, the memory buffer is still receiving input data. The "one out, one in" method is followed to maximize the buffer efficiency. The input data by using Mapping Scheme B for buffer writes is then recorded.

Further, at step 33, after the whole buffer is read out for processing and is replaced by new data, it is ready to process another 8 lines stored in the buffer. It is essential to make sure the output sequence is correct for 2D-DCT operations. Data is read out by using Mapping Scheme A for buffer reads this time. This mapping automatically guarantees the output sequence required by 2D-DCT operations.

Moreover, at step 34, as in step 32, the memory buffer is still receiving input data while reading out data for the 2D-DCT. The input data is recorded by using Mapping Scheme A for buffer writes.

Finally, after the whole buffer is read out for processing and is replaced by new data, Mapping Scheme B is switched for both buffer reads and writes. As from step 31 to step 34, the two mapping schemes are interleaved to guarantee correct output sequences while the buffer is kept full all the time.

By interleaving the simple address mapping schemes, the dilemma in 2D data transforms can be resolved. In addition, the output flow is continuous after the first filling. The task scheduling automatically follows the data output throughout. The process loading is smoothed out without loading bursts.

In the invention, a pre-buffer can be used to store data. This pre-buffer can be replaced by a "staging buffer" which stores temporary data between the "first one-dimensional" and "second one-dimensional" operations in 2D-DCT processes. The same concept can be applied to the staging buffer. In addition, the mapping schemes mentioned above can be modified or combined with more address manipulations to accommodate different operational requirements.

The invention achieves maximum buffer efficiency without trading off loading requirement. It does need a complicated address recording scheme to fulfill the output sequences required by 2D-DCT operations. The 2D-DCT operations can also be scheduled accordingly. No existing methods can resolve the same dilemma without increasing the system complexity significantly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of buffer management and task scheduling for two-dimensional data transforming, which transforms data in a buffer sequentially by blocks, wherein a block comprises a specific size having plurality of row portions and a plurality of column portions, comprising the steps of:
   (a) reading out old data in a block-by-block pattern and immediately writing in new data in a line-by-line pattern in the block using a first mapping scheme;
   (b) moving the block to transform another column portion; and
   (c) reading out old data in a block-by-block pattern and immediately writing in new data in a line-by-line pattern in the block using a second mapping scheme, wherein the first mapping scheme and the second mapping scheme are interleaved in use, and satisfying requirement of a data sequence of the two-dimensional data transforming,
   wherein the first and second mapping scheme translate logical addresses to physical addresses, and the physical address in the first mapping scheme is equivalent to {sector address, line address, block address, dot address}.

2. The method of claim 1, wherein an initialization step prior to step (a) is performed so as to set up a write logic address and a read logic address to zero.

3. The method of claim 2, wherein the initialization step comprises completely filling the block with data using the second mapping scheme.

4. The method of claim 3, wherein the write logic address is incremented by 1 per buffer write and the read logic address is incremented by 1 per buffer read.

5. The method of claim 1, after the step (c) further comprising step (d) moving the block to transform another column portion.

6. The method of claim 5, wherein step (a) to step (d) are repeated until the whole data in the buffer is transformed.

7. The method of claim 1, wherein the data transforming is a two-dimensional Discrete Cosine Transform.

8. The method of claim 1, wherein the buffer is a pre-buffer.

9. The method of claim 1, wherein the buffer is a staging buffer.

10. The method of claim 1, wherein the block has an 8×8 block size.

11. The method of claim 1, wherein the data is an image comprising 512 pixels of columns and 8 lines of rows.

12. The method of claim 11, wherein each pixel has a 9-bit pixel address which is separated to a 3-bit dot address, 3-bit block address and a 3-bit sector address and wherein each line is a 3-bit line address.

13. The method of claim 1, wherein the physical address in the second mapping scheme is equivalent to (sector address, block address, line address, dot address).

14. A method of buffer management and task scheduling for two-dimensional data transforming, which transforms data in a buffer sequentially by blocks, wherein a block comprises a specific size having plurality of row portions and a plurality of column portions, comprising the steps of:

(a) initializing a write logic address and a read logic address to zero;

(b) reading out old data in a block-by-block pattern and immediately writing in new data in a line-by-line pattern in the block using a first mapping scheme, wherein the write logic address and the read logic address is incremented by 1;

(c) moving the block to transform another column portion; and (d) reading out old data in a block-by-block pattern and immediately writing in new data in a line-by-line pattern in the block using a second mapping scheme, wherein the write logic address and the read logic address is incremented by 1, wherein the first mapping scheme and the second mapping scheme are interleaved in use, and satisfying requirement of a data sequence of the two-dimensional data transforming, wherein the first and second mapping scheme translate logical addresses to physical addresses, and the physical address in the first mapping scheme is equivalent to {sector address, line address, block address, dot address}.

15. The method of claim 14, wherein the step (a) comprises completely filling the block with data using the second mapping scheme and incrementing the write logic address by 1.

16. The method of claim 14, after step (d) further comprising step (e) moving the block to transform another column portion.

17. The method of claim 16, wherein step (b) to step (e) are repeated until the whole data in the buffer is transformed.

18. The method of claim 14, wherein the data transforming is a two-dimensional Discrete Cosine Transform.

19. The method of claim 14, wherein the buffer is a pre-buffer.

20. The method of claim 14, wherein the buffer is a staging buffer.

21. The method of claim 14, wherein the block has an 8×8 block size.

22. The method of claim 14, wherein the data is an image comprising 512 pixels of columns and 8 lines of rows.

23. The method of claim 22, wherein each pixel has a 9-bit pixel address which is separated to a 3-bit dot address, 3-bit block address and a 3-bit sector address and wherein each line is a 3-bit line address.

24. The method of claim 14, wherein the physical address in the second mapping scheme is equivalent to {sector address, block address, line address, dot address}.

* * * * *